(12) United States Patent
Bancroft et al.

(10) Patent No.: US 10,036,494 B2
(45) Date of Patent: *Jul. 31, 2018

(54) SEAL WITH LIP PROJECTIONS

(71) Applicant: Victaulic Company, Easton, PA (US)

(72) Inventors: Philip Wayne Bancroft, Belvidere, NJ (US); Matthew A. Bowman, Palmer, PA (US); Kathryn E. Yovanovich, Nazareth, PA (US)

(73) Assignee: Victaulic Company, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,684

(22) Filed: Sep. 29, 2017

(65) Prior Publication Data

US 2018/0023735 A1 Jan. 25, 2018

Related U.S. Application Data

(63) Continuation of application No. 14/963,361, filed on Dec. 9, 2015, now Pat. No. 9,903,515.

(51) Int. Cl.
*F16L 21/02* (2006.01)
*F16J 15/02* (2006.01)

(52) U.S. Cl.
CPC ............ *F16L 21/02* (2013.01); *F16J 15/022* (2013.01)

(58) Field of Classification Search
CPC ......... F16L 17/04; F16L 41/021; F16L 43/00; F16J 15/022
See application file for complete search history.

(56) References Cited

U.S. PATENT DOCUMENTS

| 508,765 | A | | 11/1893 | Rouse |
| 808,512 | A | | 12/1905 | Cook |
| 1,440,207 | A | | 12/1922 | Burns |
| 1,563,464 | A | | 12/1925 | Bisland |
| 1,833,776 | A | * | 11/1931 | Dillon ..................... F16L 17/04 248/56 |
| 1,867,891 | A | * | 7/1932 | Reynolds ................ F16L 17/04 277/616 |
| 1,899,695 | A | | 2/1933 | Johnson |
| 1,930,194 | A | | 10/1933 | Dillon |

(Continued)

FOREIGN PATENT DOCUMENTS

| DE | 19722935 | 9/1998 |
| DE | 29813935 | 12/1998 |

(Continued)

OTHER PUBLICATIONS (Author Unknown); Copper Xpress; Pegler Yorkshire brochure; Aug. 16, 2007.

(Continued)

*Primary Examiner* — Eugene G Byrd
(74) *Attorney, Agent, or Firm* — Ballard Spahr LLP

(57) ABSTRACT

Seals for mechanical couplings and fittings have sealing surfaces with one or more projections that form closable leak paths between the coupling or fitting and pipe elements being joined. The leak paths close when the coupling or fitting is properly installed. Otherwise, the leak paths remain open to ensure that improperly installed couplings and fittings can be discovered during pressure testing and before service pressure is applied.

29 Claims, 12 Drawing Sheets

(56) References Cited

U.S. PATENT DOCUMENTS

| | | | | |
|---|---|---|---|---|
| 2,041,132 | A | * | 5/1936 | Johnson .................. F16L 17/04 277/616 |
| 2,106,829 | A | | 2/1938 | Christenson |
| 2,980,449 | A | | 4/1961 | Dunton |
| 3,394,952 | A | * | 7/1968 | Garrett .................. F16L 21/005 285/236 |
| 3,664,691 | A | | 5/1972 | Nakamura |
| 3,680,894 | A | * | 8/1972 | Young .................... F16L 17/04 277/616 |
| 3,977,705 | A | * | 8/1976 | Thiessen ............... F16L 17/073 285/112 |
| 4,126,339 | A | | 11/1978 | Thompson |
| 4,671,541 | A | * | 6/1987 | Webb ..................... F16L 25/14 285/112 |
| 4,726,611 | A | * | 2/1988 | Sauer .................... F16L 21/005 285/110 |
| 4,822,077 | A | * | 4/1989 | Hendrickson ........... F16L 17/04 285/112 |
| 5,056,833 | A | * | 10/1991 | Webb ..................... F16L 17/04 285/148.23 |
| 5,295,697 | A | | 3/1994 | Weber et al. |
| 5,947,532 | A | | 9/1999 | Lorenz |
| 6,260,891 | B1 | | 7/2001 | Foering et al. |
| 6,328,352 | B1 | * | 12/2001 | Geppert .................. F16L 21/06 285/104 |
| 6,499,771 | B1 | * | 12/2002 | Snyder, Sr. ......... F16L 37/0915 285/319 |
| 6,581,983 | B1 | | 6/2003 | Viegener |
| 7,121,593 | B2 | * | 10/2006 | Snyder, Sr. ........... F16L 37/091 285/340 |
| 7,472,911 | B2 | | 1/2009 | Sun et al. |
| 8,235,427 | B2 | * | 8/2012 | Jones .................. F16L 37/0845 285/339 |
| 8,646,814 | B2 | | 2/2014 | Lippka et al. |
| 9,182,058 | B2 | * | 11/2015 | Cygler, III .............. F16L 17/04 |
| 2004/0036233 | A1 | | 2/2004 | Schleth et al. |
| 2005/0212284 | A1 | * | 9/2005 | Dole ..................... B21D 17/04 285/110 |
| 2005/0253029 | A1 | * | 11/2005 | Gibb ...................... F16L 17/04 248/158 |
| 2005/0253383 | A1 | | 11/2005 | Gibb et al. |
| 2006/0244222 | A1 | * | 11/2006 | Davey .................. F16L 37/252 277/608 |
| 2007/0040336 | A1 | * | 2/2007 | Sun ........................ F16L 17/04 277/608 |
| 2009/0058015 | A1 | | 3/2009 | Laule et al. |
| 2009/0146417 | A1 | * | 6/2009 | Lippka .................. F16L 17/025 285/112 |
| 2010/0001521 | A1 | * | 1/2010 | Vandal .................... F16L 17/04 285/337 |
| 2010/0025992 | A1 | | 2/2010 | Spence |
| 2011/0037250 | A1 | * | 2/2011 | Bowman ................ F16L 17/04 285/110 |
| 2012/0248767 | A1 | * | 10/2012 | Lippka .................... F16L 17/04 285/369 |
| 2013/0187346 | A1 | * | 7/2013 | Beagen, Jr. ........... F16L 21/065 277/626 |
| 2013/0200609 | A1 | | 8/2013 | Dole et al. |
| 2016/0010775 | A1 | * | 1/2016 | Morroney ............... F16L 33/00 285/127.1 |
| 2017/0167645 | A1 | * | 6/2017 | Bancroft .................. F16L 21/02 |

FOREIGN PATENT DOCUMENTS

| | | | |
|---|---|---|---|
| EP | 1555473 A1 | 2/2005 | |
| EP | 1555473 B1 | 8/2006 | |
| EP | 1847753 | 5/2008 | |
| GB | 2211255 | 6/1989 | |
| GB | 2211255 A * | 6/1989 | ............. F16L 17/04 |
| JP | 2180398 | 3/1992 | |
| JP | 4167657 | 10/2008 | |
| WO | 03052311 | 11/2002 | |

OTHER PUBLICATIONS (Author Unknown); www.geberit.co.uk; Geberit Mapress Stainless Steel; 2015 Geberit UK.

(Author Unknown); Eurotubi PressFitting System brochure; LBP (Leak Before Press) O-ring; Jul. 30, 2012.

(Author Unknown); VSH Press brochure; VSH Press System Handbook; 2009.

* cited by examiner

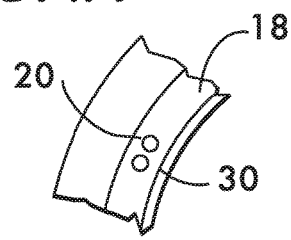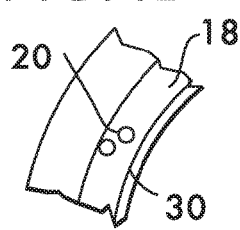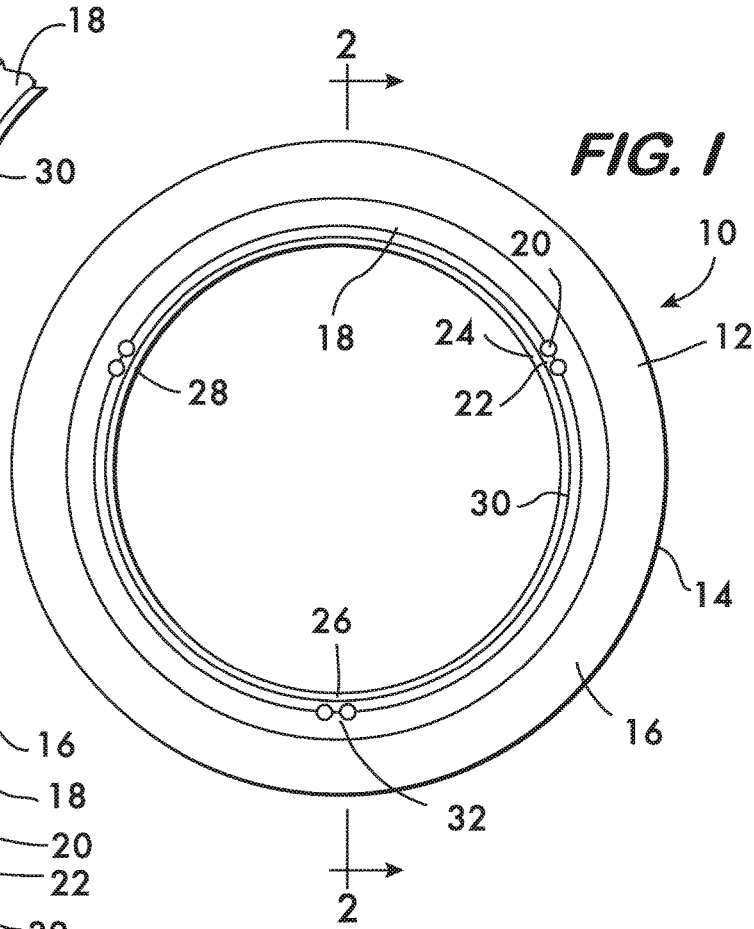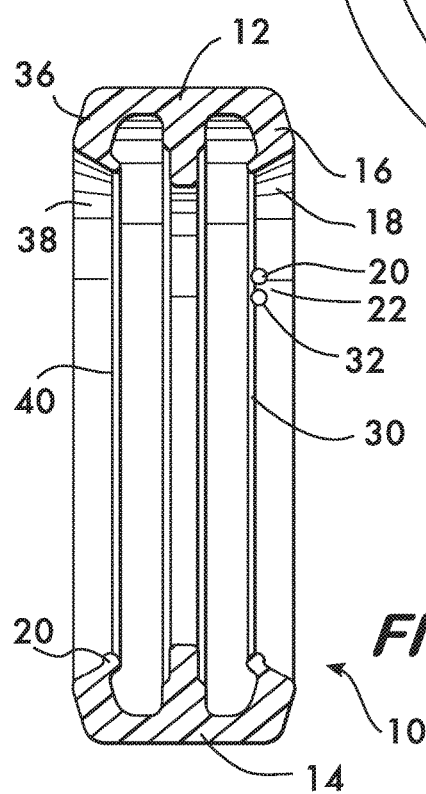

SEAL WITH LIP PROJECTIONS

CROSS REFERENCE TO RELATED APPLICATION

This application is a continuation of and claims priority to U.S. patent application Ser. No. 14/963,361, filed Dec. 9, 2015 and hereby incorporated by reference in its entirety.

FIELD OF THE INVENTION

This invention relates to seals for mechanical couplings and fittings for joining pipe elements.

BACKGROUND

Mechanical couplings and fittings (such as elbow and Tee fittings) for joining pipe elements employ flexible, resilient seals to form fluid-tight joints, capable of withstanding service pressures for a particular application. In operation, a seal is positioned between the segments or housing portions which are bolted together to respectively form the coupling or fitting. The seal has circumferential sealing surfaces that engage the outer surfaces of the pipe elements when the pipe elements are inserted into or otherwise engaged with the coupling or fitting. Upon proper tightening of the bolts the seal is compressed between the coupling segments or the housing portions and the pipe elements, the segments or housing portions engage and mechanically restrain the pipe elements, and a fluid-tight joint, capable of withstanding the required design service pressure, is formed.

However, in a piping network having tens or hundreds of mechanical couplings and fittings it is possible that one or more couplings or fittings might be improperly installed. The most common problem is the bolts not being tightened or not sufficiently tightened. Such a coupling or fitting might not be fluid tight under service pressure, but, because the seal has sealing surfaces that engage the pipe elements before tightening of the bolts, such improperly installed couplings or fittings might tend to maintain a fluid-tight seal under the relatively lower test pressure used to check the integrity of the piping network and thus might give a false indication of proper installation. Because the improperly installed couplings do not leak under test pressure they might not be found until full service pressure is applied to the network. It is desirable to avoid this situation, and thus it is advantageous to have seals that intentionally leak if the coupling or fitting of which they are a part is improperly installed.

SUMMARY

The invention concerns a seal. In one example embodiment the seal comprises a ring having a peripheral wall extending circumferentially therearound. A first lobe is attached to the peripheral wall. The first lobe extends circumferentially around the ring. A first sealing surface is positioned on the first lobe. The first sealing surface extends circumferentially around the ring. At least a first projection extends from the first sealing surface. The first projection defines a closeable leak path across the first sealing surface.

By way of example, the first lobe may comprise a free edge, the first projection being positioned proximate to the free edge. In another example the first lobe comprises a free edge, the first projection being positioned distal to the free edge. Further by way of example, the seal comprises at least a second projection extending from the first sealing surface, the second projection defining a closeable leak path across the first sealing surface.

In an example embodiment, the first lobe comprises a free edge, and the first and second projections are positioned proximate to the free edge. By way of example, the first and second projections may be positioned adjacent to one another. In a further example, the first and second projections are positioned in spaced relation to one another angularly about the ring. In a particular example, the first and second projections are positioned 180° apart from one another. In a further example, the first lobe comprises a free edge, and the first and second projections are positioned distal to the free edge. In another example, the first and second projections are positioned adjacent to one another. In a further example, the first and second projections are positioned in spaced relation to one another angularly about the ring. In a particular example, the first and second projections are positioned 180° apart from one another.

Further by way of example, the first lobe may comprise a free edge, and the first projection is positioned adjacent to the free edge, the second projection being positioned distal to the free edge. In another example, the first and second projections are positioned adjacent to one another. Further by way of example, the first and second projections are positioned in spaced relation to one another angularly about the ring. In a specific example, the first and second projections are positioned 180° apart from one another. In a specific example embodiment, the first projection has a convexly curved shape. In a particular example, the first projection has a hemispherical shape.

By way of further example, the seal comprises third and fourth projections extending from the first sealing surface. The third and fourth projections define respective closeable leak paths across the first sealing surface. In one example embodiment, the third and fourth projections are positioned adjacent to one another proximate to the free edge. In a particular example, the third and fourth projections are positioned adjacent to one another distal to the free edge. In another example, the third and fourth projections are positioned in spaced relation to the first and second projections angularly about the ring.

An example seal embodiment may comprise fifth and sixth projections extending from the first sealing surface. The fifth and sixth projections define respective closeable leak paths across the first sealing surface. In a particular example, the fifth and sixth projections are positioned adjacent to one another proximate to the free edge. In another example, the fifth and sixth projections are positioned adjacent to one another distal to the free edge. Further by way of example, the fifth and sixth projections are positioned in spaced relation to the third and fourth projections angularly about the ring and the third and fourth projections are positioned in spaced relation to the first and second projections angularly about the ring. In a specific example embodiment, the fifth and sixth projections are positioned 120° apart from the third and fourth projections and the third and fourth projections are positioned 120° apart from the first and second projections.

By way of example, the seal may further comprise a second lobe attached to the peripheral wall opposite to the first lobe. A second sealing surface is positioned on the second lobe. The second sealing surface extends circumferentially around the ring. In another example, at least a second projection extends from the second sealing surface, the second projection defining a closeable leak path across the second sealing surface.

Another example seal comprises a first ring having a first peripheral wall extending circumferentially therearound. A first lobe is attached to the first peripheral wall. The first lobe extends circumferentially around the first ring. A first sealing surface is positioned on the first lobe. The first sealing surface extends circumferentially around the first ring. At least a first projection extends from the first sealing surface. The first projection defines a closeable leak path across the first sealing surface. A second ring has a second peripheral wall extending circumferentially around the second ring. A second lobe is attached to the second peripheral wall. The second lobe extends circumferentially around the second ring. A second sealing surface is positioned on the second lobe. The second sealing surface extends circumferentially around the second ring. A tube connects the first and second rings to one another.

By way of example, the first lobe comprises a free edge. The first projection is positioned proximate to the free edge. In another example, the first lobe comprises a free edge, and the first projection is positioned distal to the free edge. In a further example, at least a second projection extends from the first sealing surface. The second projection defines a closeable leak path across the first sealing surface. In an example embodiment, the first lobe comprises a free edge, and the first and second projections are positioned proximate to the free edge. By way of example, the first and second projections are positioned adjacent to one another. In another example, the first and second projections are positioned in spaced relation to one another angularly about the ring. In a specific example embodiment, the first and second projections are positioned 180° apart from one another.

In an example embodiment, the first lobe comprises a free edge, and the first and second projections are positioned distal to the free edge. In another example, the first and second projections are positioned adjacent to one another. Further by way of example, the first and second projections are positioned in spaced relation to one another angularly about the ring. In a specific example, the first and second projections are positioned 180° apart from one another.

In an example embodiment, the first lobe comprises a free edge, and the first projection is positioned adjacent to the free edge, the second projection being positioned distal to the free edge. By way of example, the first and second projections are positioned adjacent to one another. In another example, the first and second projections are positioned in spaced relation to one another angularly about the ring. In a specific example, the first and second projections are positioned 180° apart from one another.

By way of example, the first projection has a convexly curved shape. In a particular example, the first projection has a hemispherical shape.

An example embodiment may further comprise third and fourth projections extending from the first sealing surface. The third and fourth projections define respective closeable leak paths across the first sealing surface. In an example embodiment, the third and fourth projections are positioned adjacent to one another proximate to the free edge. In another example, the third and fourth projections are positioned adjacent to one another distal to the free edge. Further by way of example, the third and fourth projections are positioned in spaced relation to the first and second projections angularly about the ring. In a specific example embodiment, the third and fourth projections are positioned 180° apart from the first and second projections. In another example embodiment, the seal further comprises at least a second projection extending from the second sealing surface. By way of example, the first and second rings are oriented angularly with respect to one another. In a particular example, the first and second rings have an orientation angle of 90°.

The invention further encompasses a fitting for connecting at least two pipe elements together. In one example embodiment the fitting comprises first and second housing portions attached to one another and defining at least first and second receptacles for receiving the pipe elements. The housing portions further define a fluid path extending between the first and second receptacles. A seal is positioned between the first and second housing portions. In an example embodiment the seal comprises a first ring having a first peripheral wall extending circumferentially therearound. The first ring is received within the first receptacle. A first lobe is attached to the first peripheral wall. The first lobe extends circumferentially around the first ring. A first sealing surface is positioned on the first lobe. The first sealing surface extends circumferentially around the first ring. At least a first projection extends from the first sealing surface. The first projection defines a closeable leak path across the first sealing surface. A second ring having a second peripheral wall extends circumferentially around the second ring. The second ring is received within the second receptacle. A second lobe is attached to the second peripheral wall. The second lobe extends circumferentially around the second ring. A second sealing surface is positioned on the second lobe. The second sealing surface extends circumferentially around the second ring. A tube connects the first and second rings to one another and extends along the fluid path. A plurality of adjustable connection members attach the first and second housing portions to one another. The housing portions are supported in spaced apart relation sufficient to permit the pipe elements to be inserted into the receptacles while the housing portions are attached to one another. The first and second sealing surfaces respectively contact the pipe elements. The first projection engages one of the pipe elements and maintains a portion of the first sealing surface in spaced relation away therefrom. Each connection member is adjustably tightenable so as to draw the housing portions toward one another and compress the portion of the first sealing surface into sealing engagement with the one pipe element thereby closing the leak path.

In a particular example embodiment, the housing portions are supported in a pre-assembled state on the seal in spaced apart relation from one another sufficient to permit the pipe elements to be inserted into the receptacles.

The invention further comprises a coupling for joining pipe elements in end to end relation. In an example embodiment the coupling comprises a plurality of segments attached to one another end to end and surrounding a central space. Each of the segments has a channel extending circumferentially around and facing the central space. Connection members are positioned at opposite ends of each of the segments. The connection members are adjustably tightenable for drawing the segments toward one another. A seal is positioned between the segments. By way of example, the seal comprises a ring having a peripheral wall extending circumferentially therearound. The ring is received within the channels. A first lobe is attached to the peripheral wall. The first lobe extends circumferentially around the ring. A first sealing surface is positioned on the first lobe. The first sealing surface extends circumferentially around the ring. At least a first projection extends from the first sealing surface. A second lobe is attached to the peripheral wall opposite to the first lobe. The second lobe extends circumferentially around the ring. A second sealing surface is positioned on the second lobe. The second sealing surface extends circumferentially around the ring. The segments are supported in spaced apart relation sufficient to permit the pipe elements to be inserted into the central space while the segments are attached to one another. The first and second sealing surfaces respectively contact the pipe elements. The first projection engages one of the pipe elements and maintains a portion of the first sealing surface in spaced relation away therefrom. Tightening of the connection members draws the segments toward one another thereby compressing the portion of the first sealing surface into sealing engagement with the one pipe element thereby closing the leak path. In an example embodiment the segments are supported in a pre-assembled state on the seal in spaced apart relation from one another sufficient to permit the pipe elements to be inserted into the central space.

BRIEF DESCRIPTION OF THE DRAWINGS

FIG. 1 is an axial view of an example embodiment of a seal according to the invention;

FIGS. 1A and 1B are partial views of additional example embodiments of a seal according to the invention;

FIG. 2 is a sectional view taken at line 2-2 of FIG. 1;

DETAILED DESCRIPTION

Figure 3:
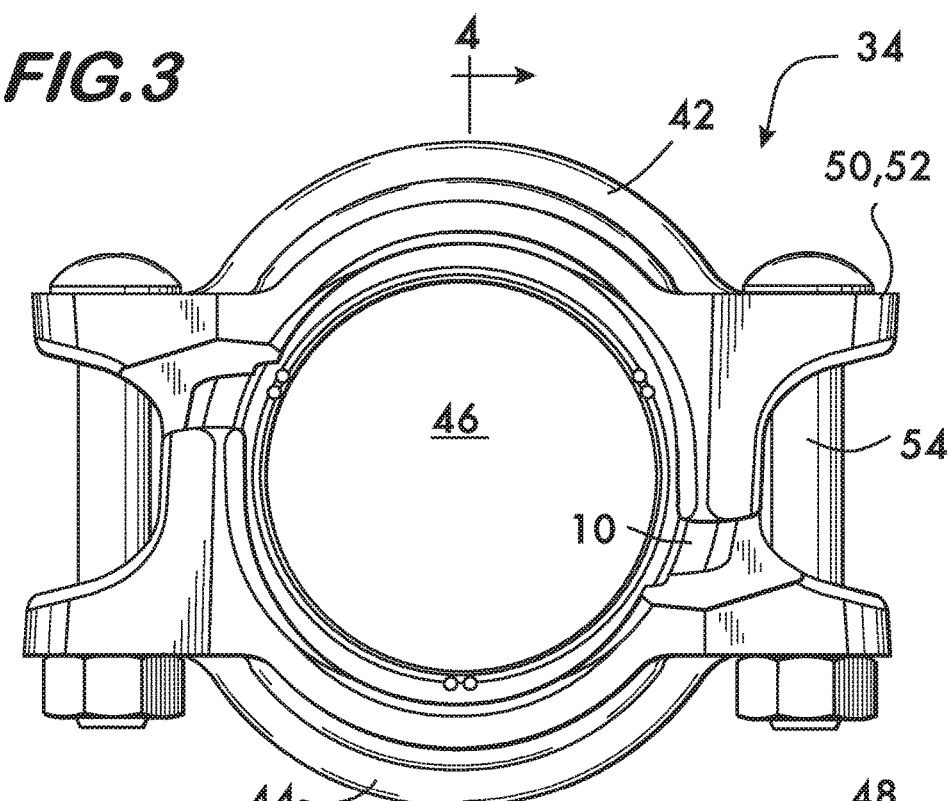
FIG. 3 is an axial view of an example coupling using the example seal shown in FIG. 1.

FIGS. 1 and 2 show an example seal 10 according to the invention. Seal 10 is formed of a flexible, resilient material such as EPDM, nitrile rubber as well as other elastomers and comprises a ring 12 having a peripheral wall 14 which extends circumferentially around the ring. A first lobe 16 is attached to the peripheral wall 14, the first lobe also extending circumferentially around the ring. A first sealing surface 18 is positioned on the first lobe. The sealing surface 18 extends circumferentially around the ring 12 and engages a pipe element to effect a fluid tight seal as described below (see also FIGS. 5 and 6). At least one projection 20 extends from the sealing surface 18. When the sealing surface 18 engages a pipe element the projection defines a closeable leak path 22 across the sealing surface by maintaining a portion of the sealing surface in spaced relation away from the pipe element.

In the example seal 10 there are six projections 20 arranged in three pairs 24, 26 and 28, the projections 20 of each pair being arranged adjacent to one another. Each projection forms a potential leak path 22 both between and adjacent to the projections 20. The projection pairs 24, 26 and 28 are arranged on the sealing surface 18 in spaced relation to one another angularly about the ring. In this particular example the pairs are positioned 120° apart from one another (see FIG. 1). Other angular configurations are of course feasible.

Lobe 16 has a free edge 30, and the projections 20 are shown in FIGS. 1 and 2 positioned on the sealing surface 18 proximate to the free edge 30. Other configurations are also expected to be effective at creating a closable leak path 22 as shown in FIG. 1A where adjacent projections 20 are positioned on the sealing surface 18 distal to the free edge 30 in spaced relation to one another angularly about the ring 12. FIG. 1B shows another configuration, wherein a pair of adjacent projections 20 is positioned on the sealing surface 18 with one projection proximate to the free edge 30 and the other distal thereto. In this example the projections 20 are positioned in spaced relation to one another angularly about the ring 12.

In the example seal embodiment 10 the projections have a convexly curved shape. As shown in FIGS. 1 and 2 the shape takes the form of a hemisphere 32. Other convex shapes, such as ellipsoids, ovals and the like are also feasible. Non-convex shapes, such as cones, cubes, parallelepipeds and pyramids are also expected to be effective as projections 20.

Figure 4:
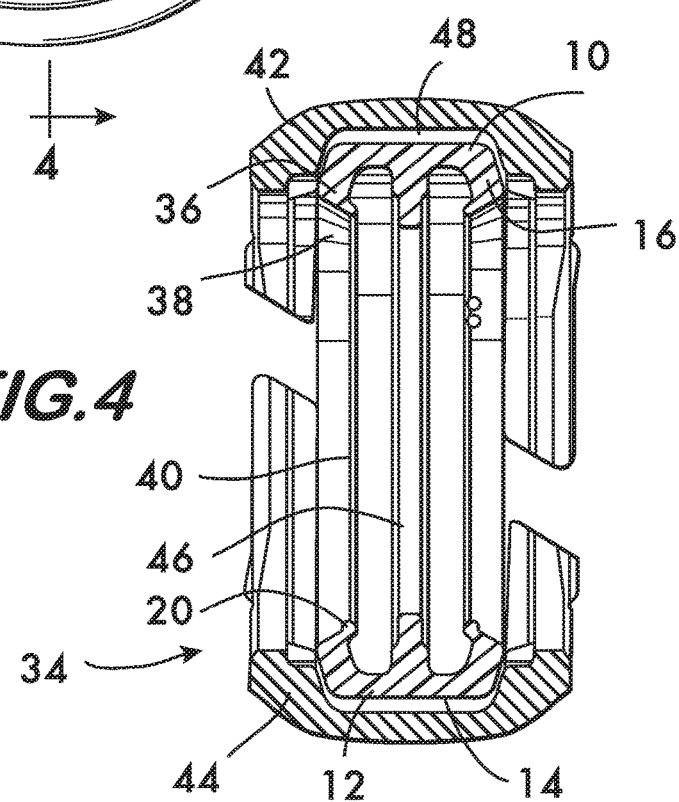
FIG. 4 is a sectional view taken at line 4-4 of FIG. 3.

The example seal embodiment 10 of FIGS. 1 and 2 is for use with a mechanical coupling 34, an example of which is shown in FIGS. 3 and 4. Seal 10 for use with coupling 34 has a second lobe 36 attached to peripheral wall 14 opposite to the first lobe 16, the second lobe extending circumferentially around the ring 12. A second sealing surface 38 is positioned on the second lobe 36, the second sealing surface also extending circumferentially around the ring 12. The second lobe 36 has a free edge 40. As shown in FIG. 2, projections 20 may also be positioned on the second lobe 36 in the various configurations as described above. In this example embodiment only a single projection 20 is present on the second lobe 36.

As shown in FIGS. 3 and 4, the coupling 34 comprises a plurality of segments, in this example two segments 42 and 44, attached to one another end to end thereby surrounding a central space 46. As shown in FIG. 4, each segment 42 and 44 has a channel 48 that extends circumferentially around and faces the central space 46. As shown in FIG. 3, connection members 50 are positioned at opposite ends of each segment 42 and 44. Connection members 50 are adjustably tightenable for drawing the segments 42 and 44 toward one another. In this example the connection members 50 comprise lugs 52 that project outwardly from the ends of the segments 42 and 44. The lugs 52 receive fasteners 54 which provide the mechanical adjustment for drawing the segments toward one another upon tightening.

As shown in FIG. 4, the seal 10 is received within channels 48 of each segment 42 and 44 and is positioned between the segments. In a particular example embodiment, seal 10 is sized so that it supports the segments in spaced apart relation sufficient to permit pipe elements to be inserted into the coupling in a pre-assembled state shown in FIG. 3. In the pre-assembled state the segments 42 and 44 are supported in spaced relation and held against the seal 10 by the fasteners 54.

Figure 5:
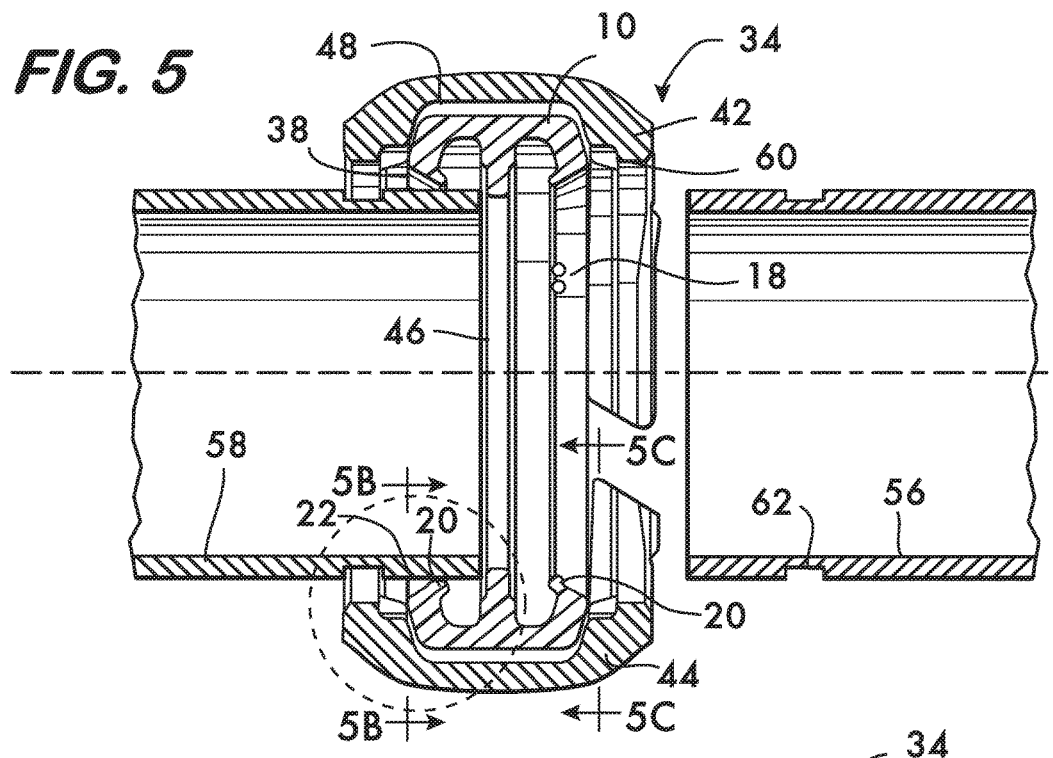
FIG. 5 is a longitudinal sectional view illustrating the formation of a pipe joint using the example seal shown in FIG. 1.
Figure 6:
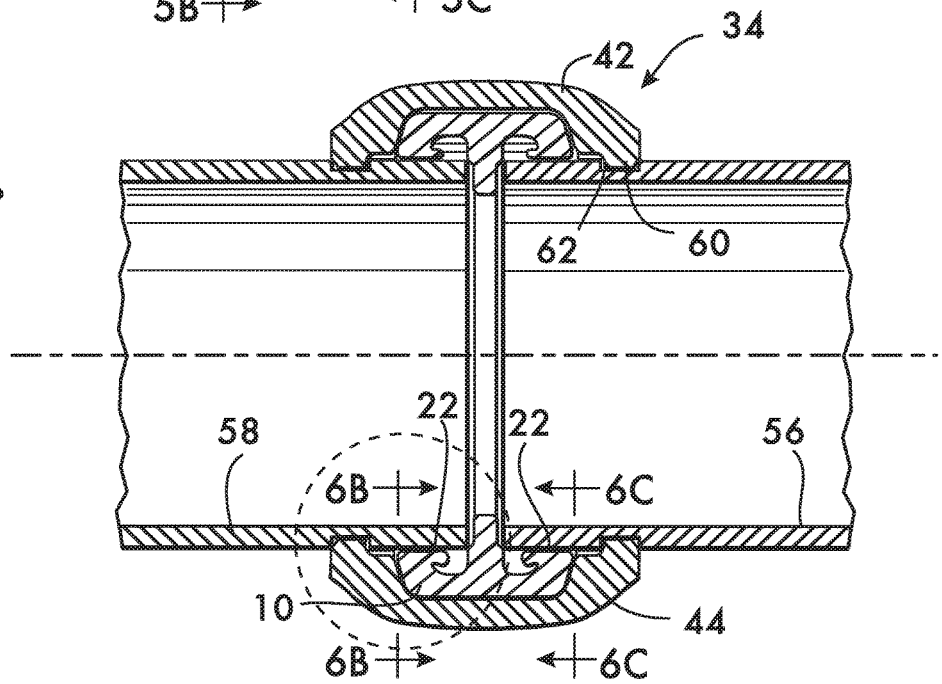
FIG. 6 is a longitudinal sectional view illustrating the formation of a pipe joint using the example seal shown in FIG. 1.

FIGS. 5 and 6 illustrate how to form a pipe joint using the example seal 10 according to the invention. As shown in FIG. 5, pipe elements 56 and 58 are inserted into the central space 46 defined by the segments 42 and 44 of coupling 34 while in its pre-assembled state. Note that the pipe elements engage and deflect the sealing surfaces 18 and 38 of the seal 10. In the absence of one or more projections 20 on at least one of the sealing surfaces 18 or 38, it is possible for a low pressure seal to form between the seal 10 and the pipe elements despite the fact that the fasteners 54 have not yet been tightened, or not tightened sufficiently to form a proper sealing joint. As a result, during low pressure testing of the piping network, the network might maintain pressure and appear fluid tight, thereby giving the false indication that all couplings have been properly installed. However, when (much higher) service pressure is applied to the network, those joints not tightened or not tightened sufficiently might leak.

In another embodiment, the coupling is not pre-assembled so as to receive the pipe elements by insertion but must first be disassembled to remove the seal from between the segments. Upon removal the seal is first lubricated and then stretched to receive a first one of the pipe elements, the seal being positioned entirely on the one pipe element. The second pipe element is then positioned in end to end relation with the first pipe element and the seal is moved so that respective sealing surfaces engage respective pipe elements. With the seal in place on both pipe elements the segments are then placed one at a time straddling the ends of the pipe elements and capturing the ring seal between them.

Figure 5A:
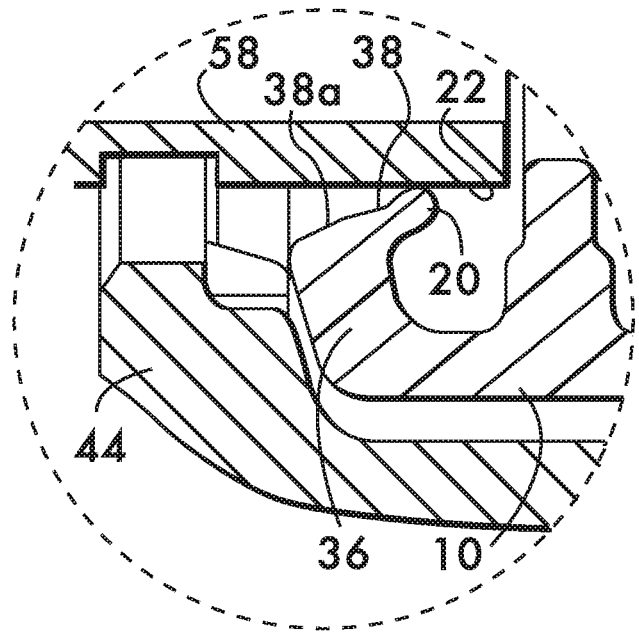
FIG. 5A shows a portion of FIG. 5 on an enlarged scale.
Figure 6A:
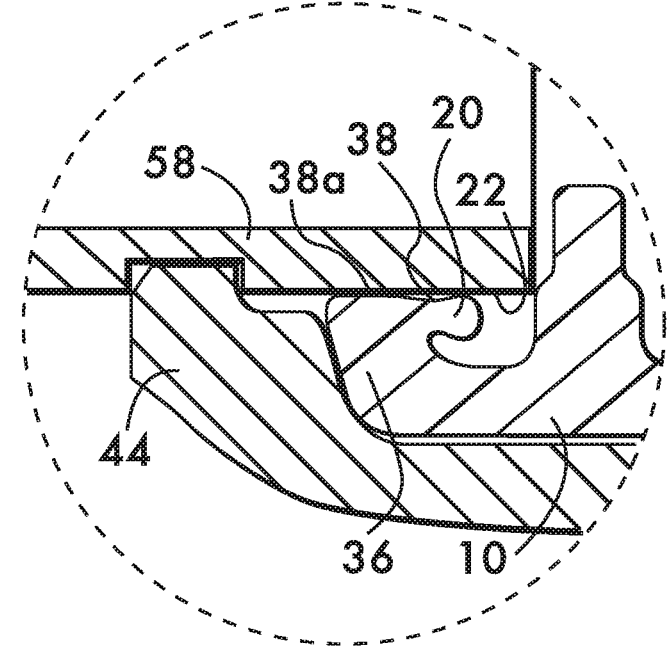
FIG. 6A shows a portion of FIG. 6 on an enlarged scale.
Figure 5B:
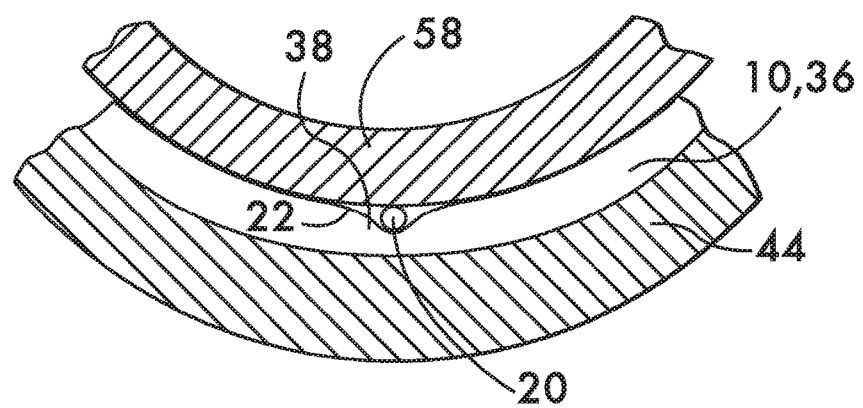
FIGS. 5B and 5C show partial sectional axial views on an enlarged scale taken respectively at lines 5B and 5C of FIG. 5.
Figure 6B:
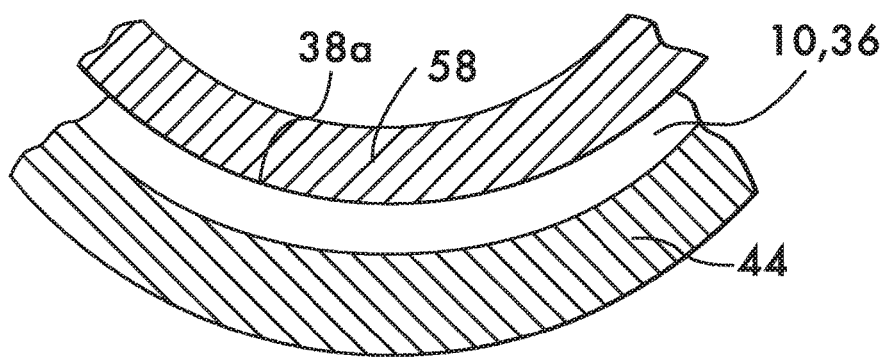
FIGS. 6B and 6C show partial sectional axial views on an enlarged scale taken respectively at lines 6B and 6C of FIG. 6.
Figure 5C:
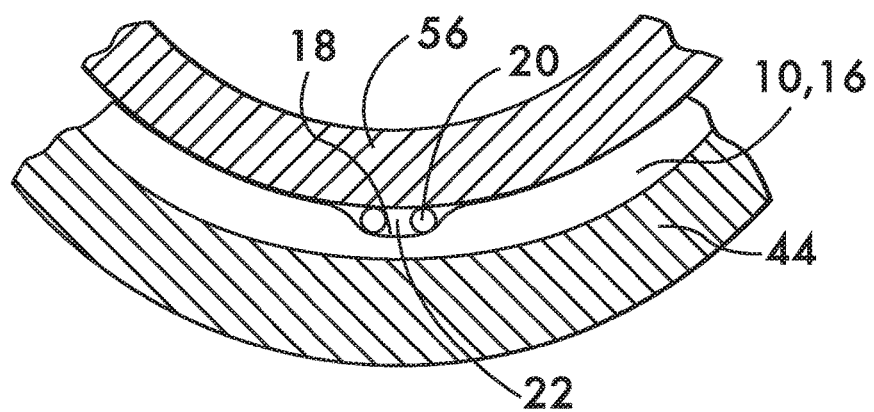
Figure 6C:
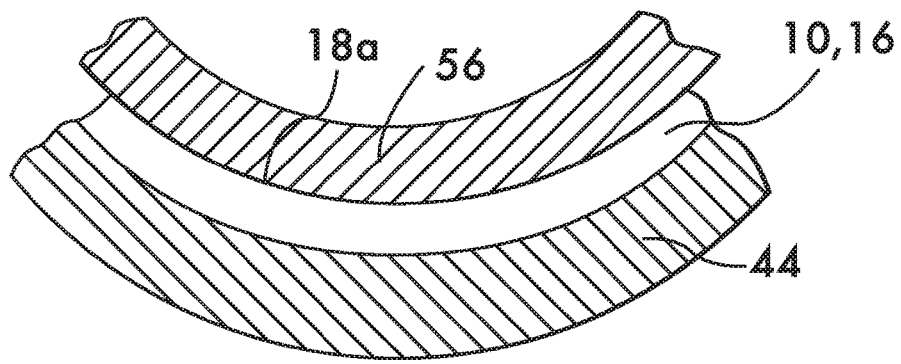

As shown in FIGS. 5A and 5B (for both pre-assembled and non-pre-assembled couplings), if one or more projections 20 are present on one or both sealing surfaces 18 and 38 (38 being shown), they prevent premature sealing by providing leak paths 22 between the sealing surfaces 18 and 38 and the pipe elements 56 and 58 when the coupling 34 is still in the pre-assembled state (or before the fasteners are tightened for a non-pre-assembled coupling). The leak paths form because the projections 20 maintain a portion of one or both the sealing surfaces 18 and 38 in spaced relation away from the pipe elements. The leak paths 22 provided by the projections 20 ensure that a low pressure test will reliably show whether or not all couplings are properly installed. As shown in FIGS. 6, 6A and 6B, the leak paths 22 close and an effective seal is formed when the fasteners 54 (see also FIG. 3) are tightened sufficiently so as to draw the segments 42 and 44 toward one another, thereby compressing and deforming the seal 10 and forcing engagement between the segments and the pipe elements to form a fluid tight mechanical joint. Comparison of FIGS. 5A and 6A shows in detail that closure of the leak path is effected by deformation of the lobe 36 to bring the outer portion 38a of sealing surface 38 into contact with the pipe element 58. FIGS. 5C and 6C illustrate similar behavior of lobe 16, which has two projections 20, and wherein outer portion 18a of sealing surface 18 effects a seal against the pipe element 56. Sufficiency of the tightening may be manifest, for example, by "pad to pad" engagement between opposing lugs 52 on segments 42 and 44 (see FIG. 3), or, by tightening the fasteners to a specified torque known through design and experiment to effect a fluid tight mechanical joint. Engagement between the coupling 34 and the pipe elements may be effected by inwardly projecting keys 60 on each segment engaging circumferential grooves 62 in the pipe elements as shown in FIG. 6. Although grooved pipe elements are illustrated, this is by way of example and it is understood that seals according to the invention are also effective when used with plain end pipe elements as well as shoulder end pipe elements.

Figure 7:
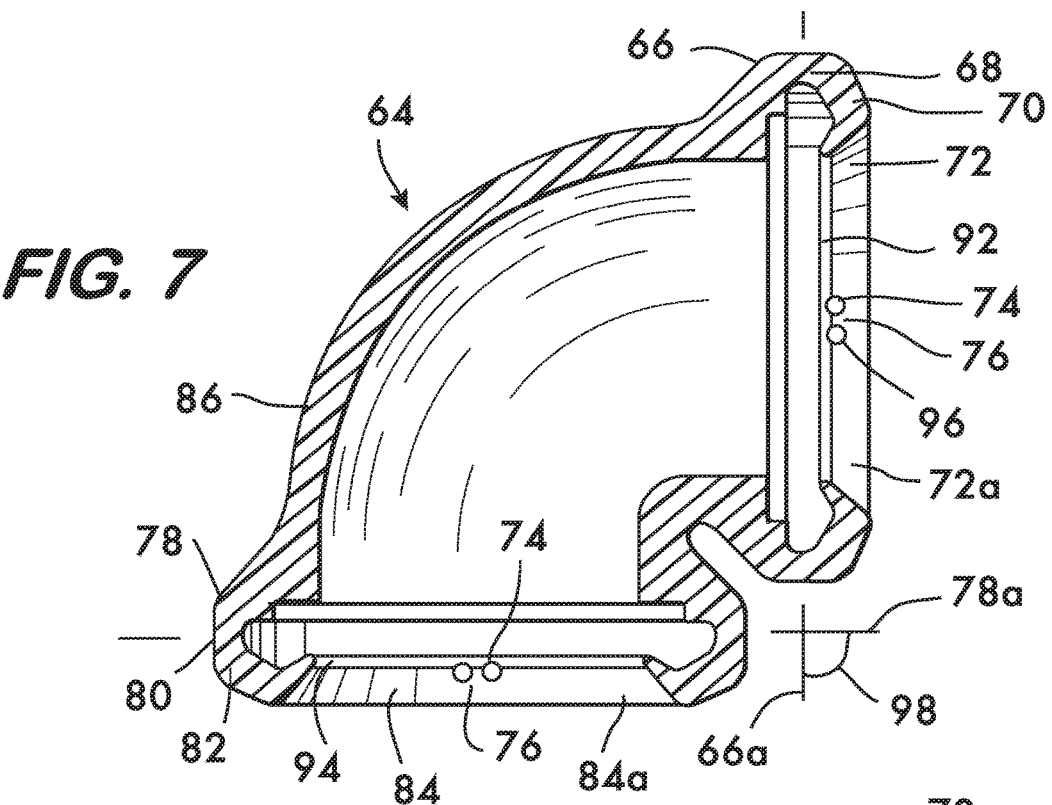
FIG. 7 is a longitudinal sectional view of another example embodiment of a seal according to the invention.
Figure 8:
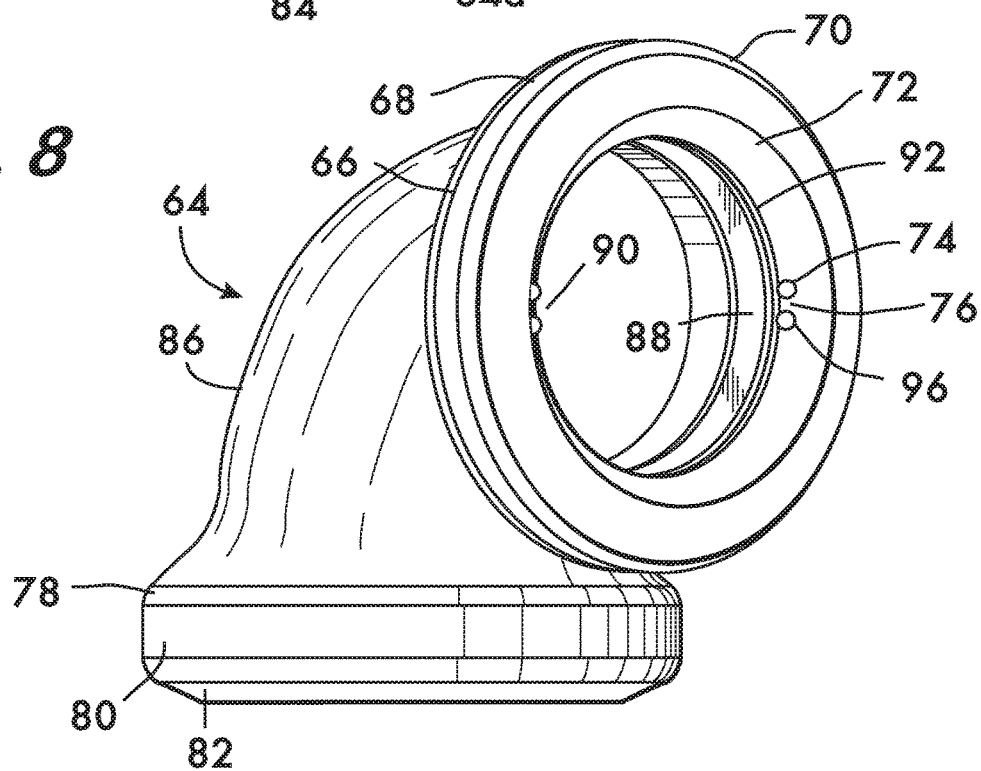
FIG. 8 is an isometric view of the seal shown in FIG. 7.
Figure 9:
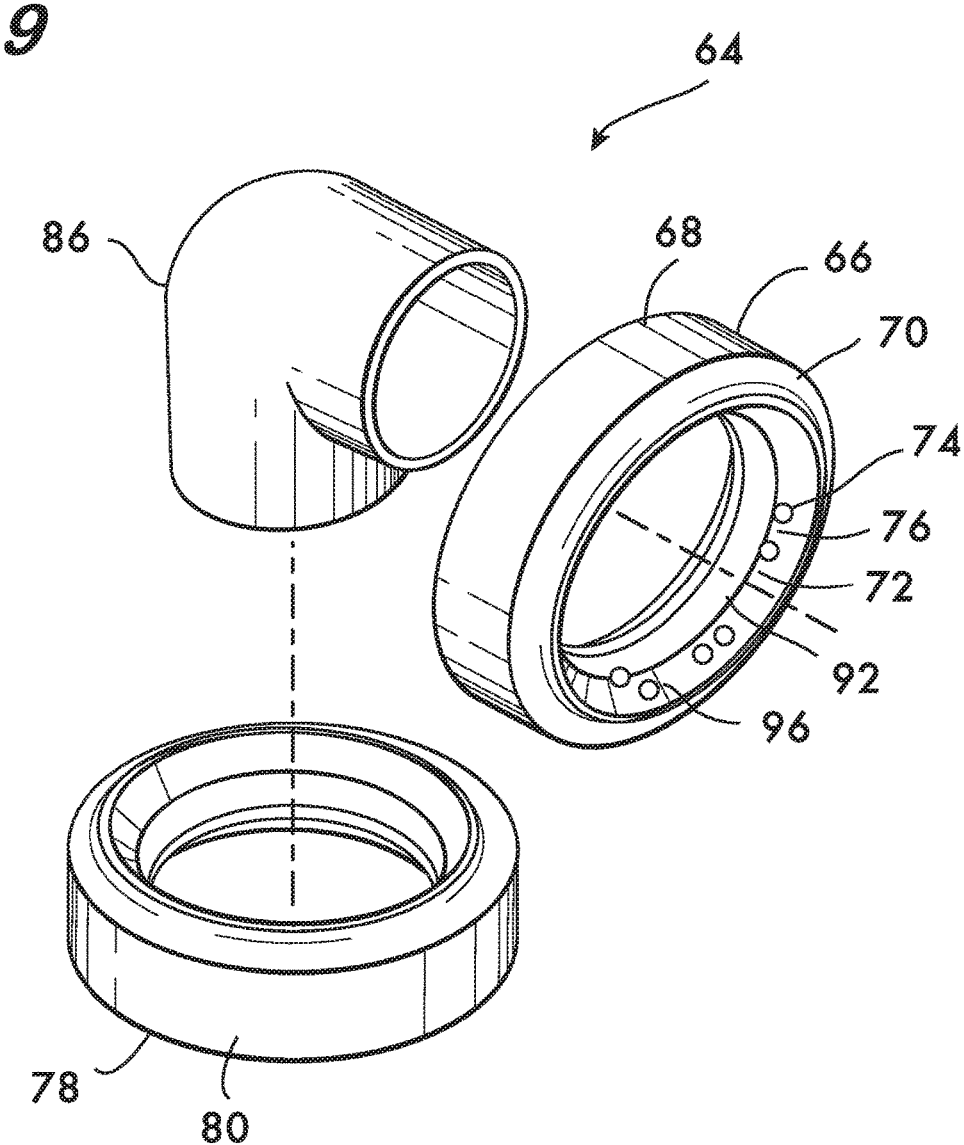
FIG. 9 is an exploded isometric view of another embodiment of an example seal according to the invention.

FIGS. 7 and 8 show another example seal 64 according to the invention. Seal 64 is formed of a flexible, resilient material such as EPDM, nitrile rubber as well as other elastomers and is used with a fitting, such as the elbow fitting shown in FIGS. 10-13. Seal 64 comprises a first ring 66 having a peripheral wall 68 which extends circumferentially around the first ring. A first lobe 70 is attached to the peripheral wall 68, the first lobe also extending circumferentially around the ring. A first sealing surface 72 is positioned on the first lobe. The sealing surface 72 extends circumferentially around the first ring 66 and engages a pipe element to effect a fluid tight seal as described below. At least one projection 74 extends from the first sealing surface 72. When the first sealing surface 72 engages a pipe element the projection defines a closeable leak path 76 across the sealing surface. Seal 64 further comprises a second ring 78 having a peripheral wall 80 which extends circumferentially around the second ring. A second lobe 82 is attached to the peripheral wall 80, the second lobe also extending circumferentially around the ring. A second sealing surface 84 is positioned on the second lobe. The sealing surface 84 extends circumferentially around the second ring 78 and engages a pipe element to effect a fluid tight seal as described below. At least one projection 74 extends from the second sealing surface 84. When the second sealing surface 84 engages a pipe element the projection defines a closeable leak path 76 across the sealing surface. A tube 86 connects the first and second rings to one another. Tube 86 may be integrally formed with the first and second rings 66 and 78 or it may comprise a separate component as shown in FIG. 9.

In the example seal 64 shown in FIG. 8, there are four projections 74 arranged in two pairs 88 and 90, the projections 74 of each pair being arranged adjacent to one another. Each projection forms a potential leak path 76 both between and adjacent to the projections 74. The projection pairs 88 and 90 are arranged on one or both of the sealing surfaces 72 and 84 (see also FIG. 7) in spaced relation to one another angularly about the ring. In this particular example the pairs are positioned 180° apart from one another (see FIG. 8). Other angular configurations are of course feasible.

As shown in FIG. 7 the first and second lobes 70 and 82 each have respective free edges 92 and 94. The projections 74 are shown in FIG. 7 positioned on the sealing surfaces 72 and 84 proximate to the free edges 92 and 94. Other configurations are also expected to be effective at creating a closable leak path 76 as shown in FIG. 9 where adjacent projections 74 are positioned on the sealing surface 72 distal to the free edge 92 in spaced relation to one another angularly about the ring 66. FIG. 9 shows another configuration, wherein a pair of adjacent projections 74 is positioned on the sealing surface 72 with one projection proximate to the free edge 92 and the other distal thereto. In these examples the projections 74 are positioned in spaced relation to one another angularly about the ring 66.

In the example seal embodiment 64 the projections 74 have a convexly curved shape. As shown in FIGS. 7-9 the shape takes the form of a hemisphere 96. Other convex shapes, such as ellipsoids, ovals and the like are also feasible. Non-convex shapes, such as cones, cubes, parallelepipeds and pyramids are also expected to be effective as projections 74.

As shown in FIG. 7, the first and second rings 66 and 78 are oriented angularly with respect to one another; that is to say, plane 66a containing ring 66 is angularly oriented with respect to plane 78a, which contains ring 78. In the example embodiment shown the orientation angle 98 is 90°, consistent with a 90° elbow fitting, but other orientation angles are of course feasible.

Figure 10:
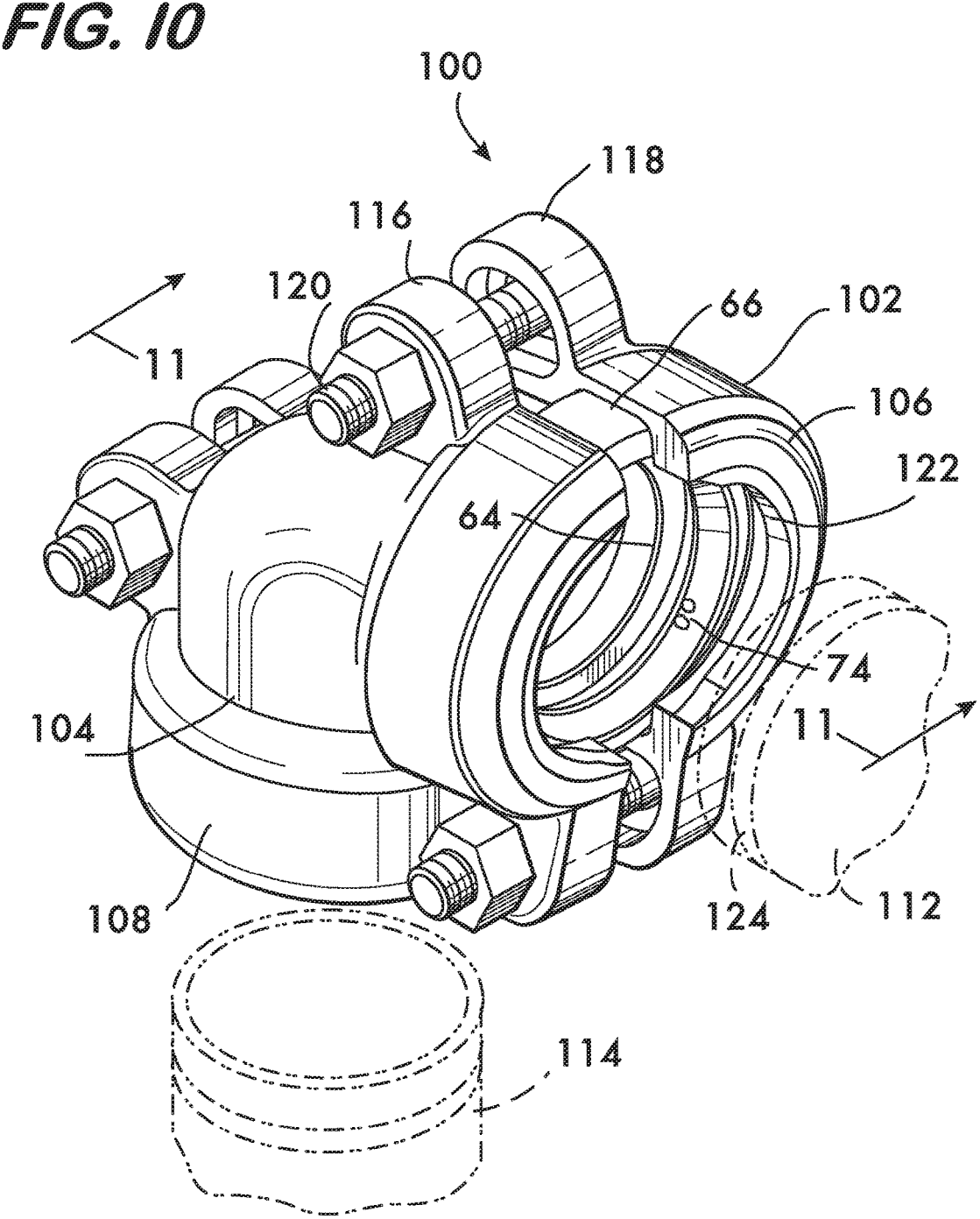
FIG. 10 is an isometric view of an example fitting using the example seal shown in FIG. 7.
Figure 11:
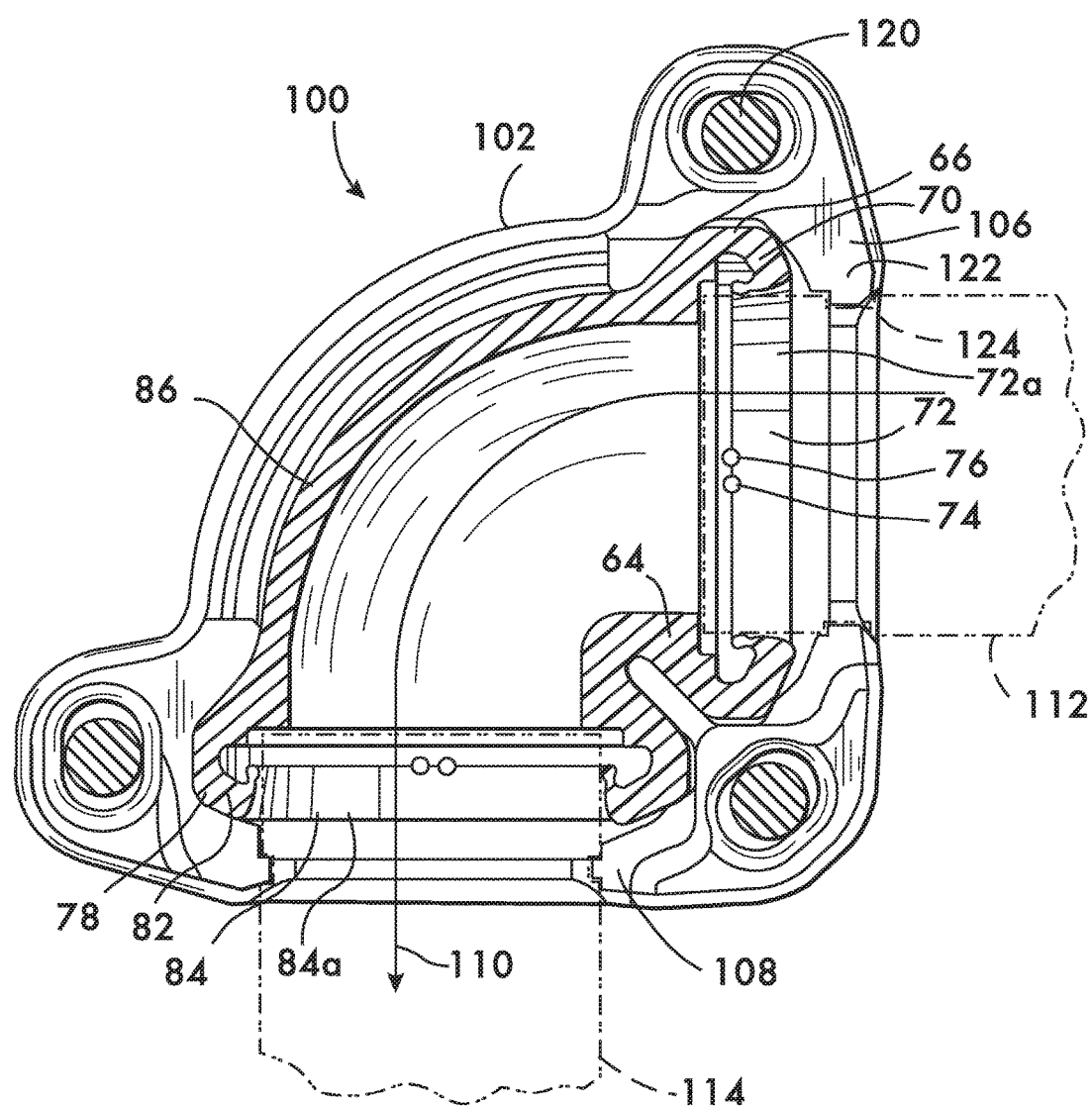
FIG. 11 is a longitudinal sectional view of the fitting taken at line 11-11 in FIG. 10.

The example seal embodiments 64 shown in FIGS. 7 and 9 are used with a fitting 100 shown in FIGS. 10-13. Fitting 100 comprises first and second housing portions 102 and 104 which attach to one another and thereby define first and second receptacles 106 and 108 and a fluid path 110 extending between (FIG. 11). Receptacles 106 and 108 receive pipe elements 112 and 114. As shown in FIGS. 10 and 11 the seal 64 is positioned between the first and second housing portions 102 and 104. Ring 66 of seal 64 is received within the receptacle 106 and ring 78 of the seal 64 is received within receptacle 108. Tube 86 extends along the fluid path 110 defined by the housing portions 102 and 104.

As shown in FIG. 10, connection members 116 are positioned on housing portions 102 and 104. Connection members 116 are adjustably tightenable for drawing the housing portions 102 and 104 toward one another. In this example the connection members 116 comprise lugs 118 that project outwardly from the housing portions 102 and 104. The lugs 118 receive fasteners 120 which provide the mechanical adjustment for drawing the housing portions toward one another upon tightening.

For the particular example embodiment shown in FIGS. 10-13, the rings 66 and 78 of seal 64 are sized to support the housing portions 102 and 104 in spaced apart relation in a pre-assembled state sufficient to permit pipe elements to be inserted into the fitting as shown in FIG. 10. In the pre-assembled state the housing portions 102 and 104 are supported in spaced relation and held against the rings 66 and 78 by the fasteners 120.

FIGS. 10-13 illustrate how to form a pipe joint using the example seal 64 according to the invention. As shown in FIG. 10, pipe elements 112 and 114 are inserted into the receptacles 106 and 108 defined by the housing portions 102 and 104 of fitting 100 while in its pre-assembled state. As shown in FIG. 11, upon insertion the pipe elements 112 and 114 engage and deflect the sealing surfaces 72 and 84 of the seal 100. In the absence of one or more projections 74 on at least one of the sealing surfaces 72 or 84, it is possible for a low pressure seal to form between the seal 100 and the pipe elements despite the fact that the fasteners 120 have not yet been tightened, or have not been tightened sufficiently to form a proper sealing joint. As a result, during low pressure testing of the piping network, the network might maintain pressure and appear fluid tight, thereby giving the false indication that all fittings have been properly installed. However, when (much higher) service pressure is applied to the network, those joints not tightened or not tightened sufficiently might leak.

Figure 12:
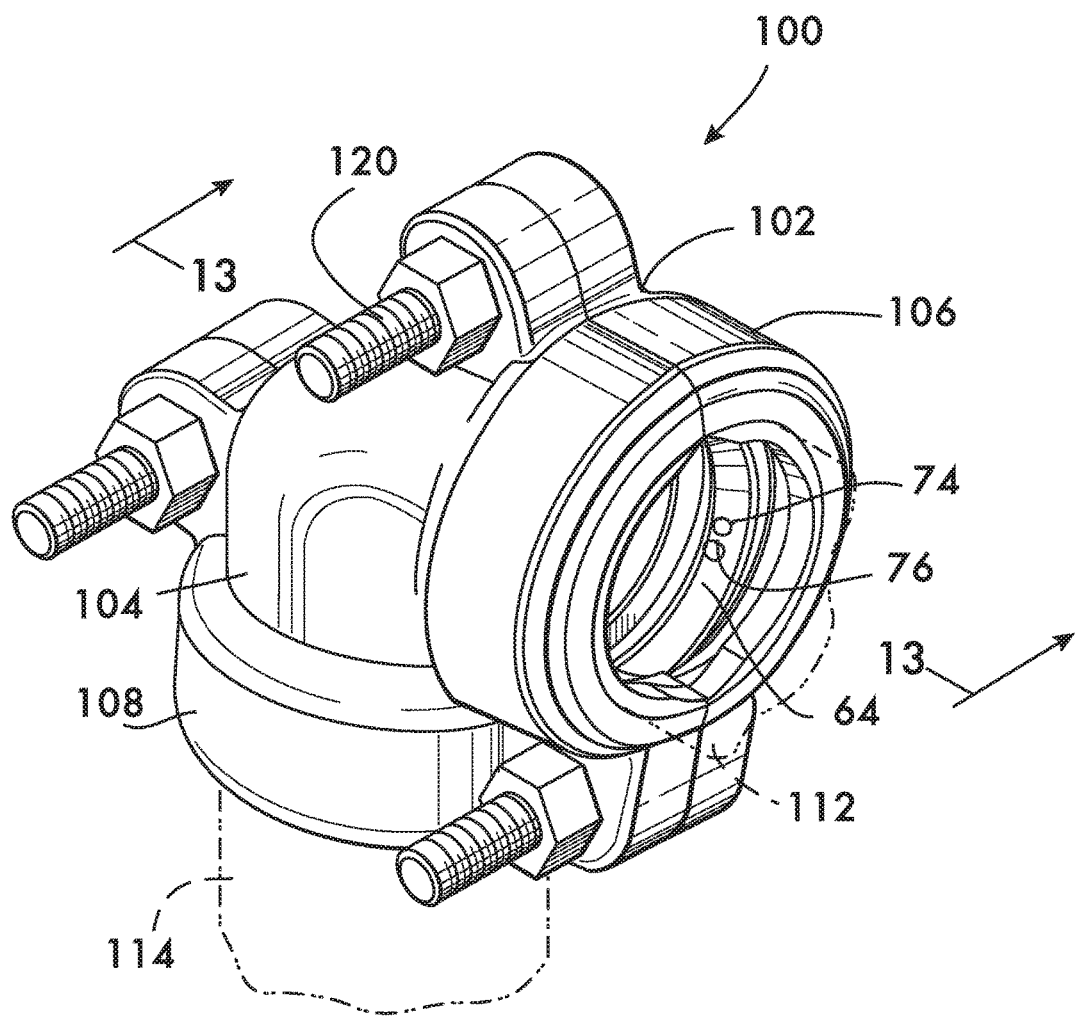
FIG. 12 is an isometric view of an example fitting using the example seal shown in FIG. 7.
Figure 13:
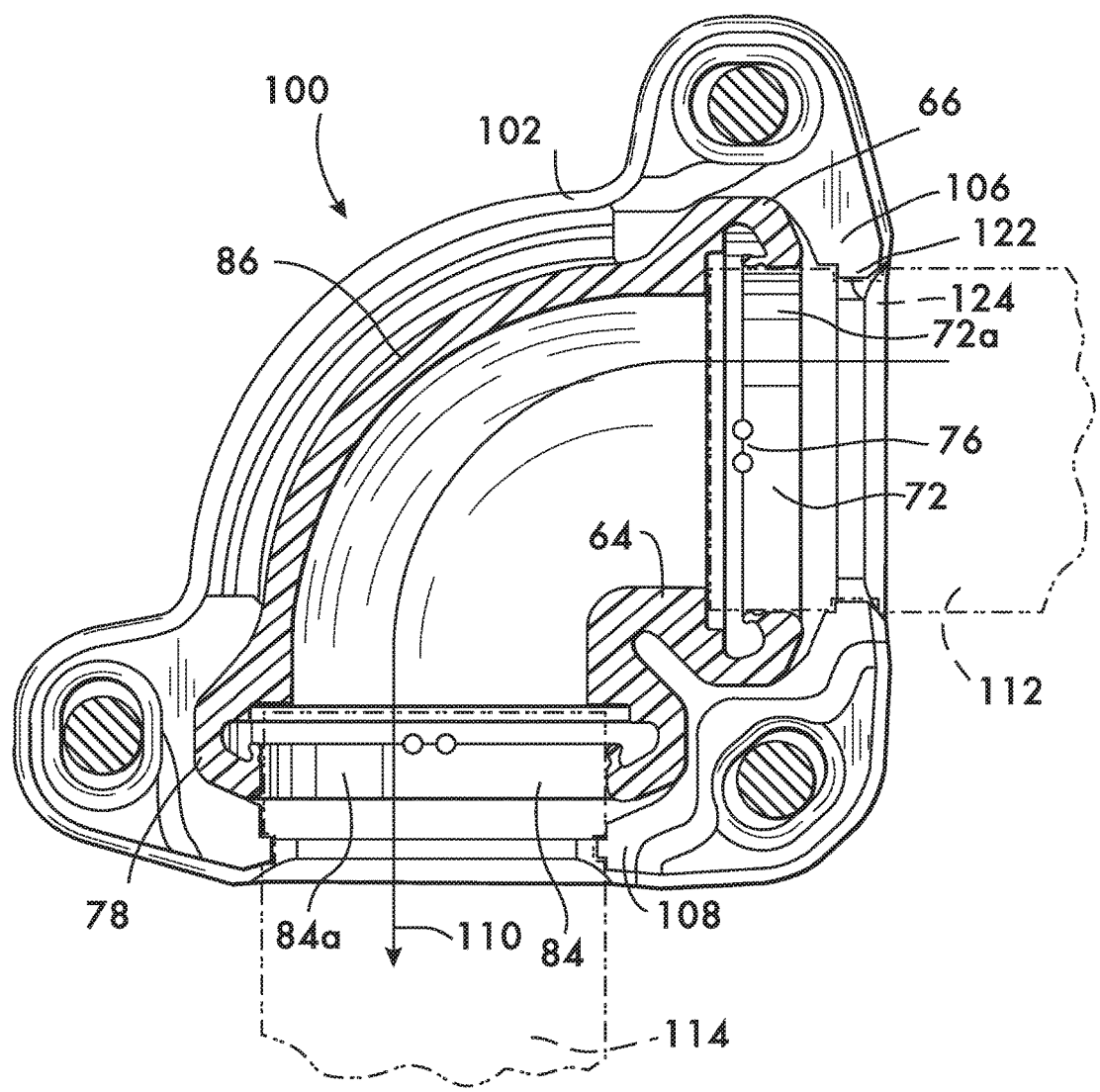
FIG. 13 is a longitudinal sectional view of the fitting taken at line 13-13 in FIG. 12.

If, as shown, one or more projections 74 are present on one or both sealing surfaces 72 and 84 however, they prevent premature sealing by providing leak paths 76 between the sealing surfaces 72 and 84 and the pipe elements 112 and 114 when the fitting 100 is still in the pre-assembled state. The leak paths form because the projections 74 maintain a portion of one or both the sealing surfaces 72 and 84 in spaced relation away from the pipe elements. The leak paths 76 provided by the projections 74 ensure that a low pressure test will reliably show whether or not all fittings are properly installed. As shown in FIGS. 12 and 13, the leak paths 76 close and an effective seal is formed when the fasteners 120 are tightened sufficiently so as to draw the housing portions 102 and 104 toward one another, thereby compressing and deforming the seal 64 and forcing engagement between the housing portions and the pipe elements to form a fluid tight mechanical joint. As seen in a comparison of FIGS. 11 and 13, behavior of seal 64 is similar to that of seal 10 in that upon tightening of the fasteners the lobes 70 and 82 deform so that outer portions 72a and 84a of sealing surfaces 72 and 80 engage the pipe elements 112 and 114 respectively to effect the seal. Sufficiency of the tightening may be manifest, for example, by "pad to pad" engagement between opposing lugs 118 on housing portions 102 and 104 as shown in FIG. 12, or, by tightening the fasteners 120 to a specified torque known through design and experiment to effect a fluid tight mechanical joint. Engagement between the fitting 100 and the pipe elements 112 and 114 may be effected by inwardly projecting keys 122 surrounding each receptacle engaging circumferential grooves 124 in the pipe elements as shown in FIG. 13. Although grooved pipe elements are illustrated, this is by way of example and it is understood that seals according to the invention are also effective when used with plain end pipe elements as well as shoulder end pipe elements.

Seals for couplings and fittings having the leak path feature as in the examples described herein are expected to improve the reliability of pressure testing of piping networks and thus increase the efficiency of installation of mechanical joints.

What is claimed is:

1. A seal, comprising:
   a ring having a peripheral wall extending circumferentially therearound;
   a first lobe attached to said peripheral wall, said first lobe extending circumferentially around said ring;
   a first sealing surface positioned on said first lobe, said first sealing surface extending circumferentially around said ring;
   at least a first projection extending from said first sealing surface, said first projection defining a closeable leak path across said first sealing surface.

2. The seal according to claim 1, wherein said first lobe comprises a free edge, said first projection being positioned proximate to said free edge.

3. The seal according to claim 1, wherein said first lobe comprises a free edge, said first projection being positioned distal to said free edge.

4. The seal according to claim 1, further comprising at least a second projection extending from said first sealing surface, said second projection defining a closeable leak path across said first sealing surface.

5. The seal according to claim 4, wherein said first lobe comprises a free edge, said first and second projections being positioned proximate to said free edge.

6. The seal according to claim 5, wherein said first and second projections are positioned adjacent to one another.

7. The seal according to claim 5, wherein said first and second projections are positioned in spaced relation to one another angularly about said ring.

8. The seal according to claim 7, wherein said first and second projections are positioned 180° apart from one another.

9. The seal according to claim 4, wherein said first lobe comprises a free edge, said first and second projections being positioned distal to said free edge.

10. The seal according to claim 9, wherein said first and second projections are positioned adjacent to one another.

11. The seal according to claim 9, wherein said first and second projections are positioned in spaced relation to one another angularly about said ring.

12. The seal according to claim 11, wherein said first and second projections are positioned 180° apart from one another.

13. The seal according to claim 4, wherein said first lobe comprises a free edge, said first projection being positioned adjacent to said free edge, said second projection being positioned distal to said free edge.

14. The seal according to claim 13, wherein said first and second projections are positioned adjacent to one another.

15. The seal according to claim 13, wherein said first and second projections are positioned in spaced relation to one another angularly about said ring.

16. The seal according to claim 15, wherein said first and second projections are positioned 180° apart from one another.

17. The seal according to claim 1, wherein said first projection has a convexly curved shape.

18. The seal according to claim 17, wherein said first projection has a hemispherical shape.

19. The seal according to claim 6, further comprising third and fourth projections extending from said first sealing surface, said third and fourth projections defining respective closeable leak paths across said first sealing surface.

20. The seal according to claim 19, wherein said third and fourth projections are positioned adjacent to one another proximate to said free edge.

21. The seal according to claim 19, wherein said third and fourth projections are positioned adjacent to one another distal to said free edge.

22. The seal according to claim 19, wherein said third and fourth projections are positioned in spaced relation to said first and second projections angularly about said ring.

23. The seal according to claim 19, further comprising fifth and sixth projections extending from said first sealing surface, said fifth and sixth projections defining respective closeable leak paths across said first sealing surface.

24. The seal according to claim 23 wherein said fifth and sixth projections are positioned adjacent to one another proximate to said free edge.

25. The seal according to claim 23, wherein said fifth and sixth projections are positioned adjacent to one another distal to said free edge.

26. The seal according to claim 23, wherein said fifth and sixth projections are positioned in spaced relation to said third and fourth projections angularly about said ring and said third and fourth projections are positioned in spaced relation to said first and second projections angularly about said ring.

27. The seal according to claim 26, wherein said fifth and sixth projections are positioned 120° apart from said third and fourth projections and said third and fourth projections are positioned 120° apart from said first and second projections.

28. The seal according to claim 1, further comprising:
a second lobe attached to said peripheral wall opposite to said first lobe;
a second sealing surface positioned on said second lobe, said second sealing surface extending circumferentially around said ring.

29. The seal according to claim 28, further comprising at least a second projection extending from said second sealing surface, said second projection defining a closeable leak path across said second sealing surface.

* * * * *